Jan. 26, 1943.    A. W. WENBORG    2,309,266
TOOTHED CULTIVATOR
Filed July 31, 1941
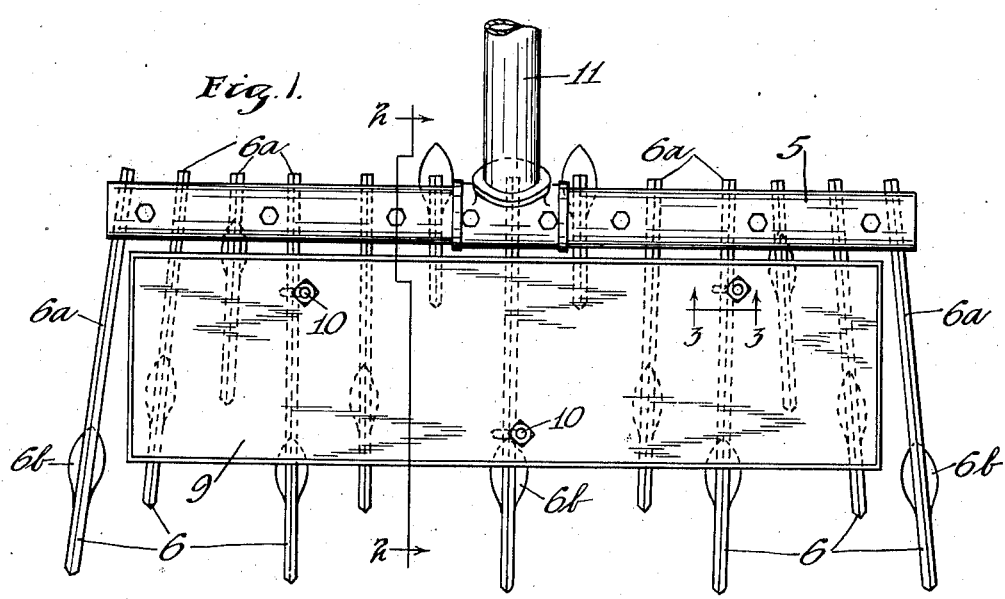
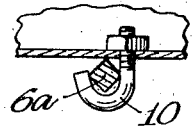
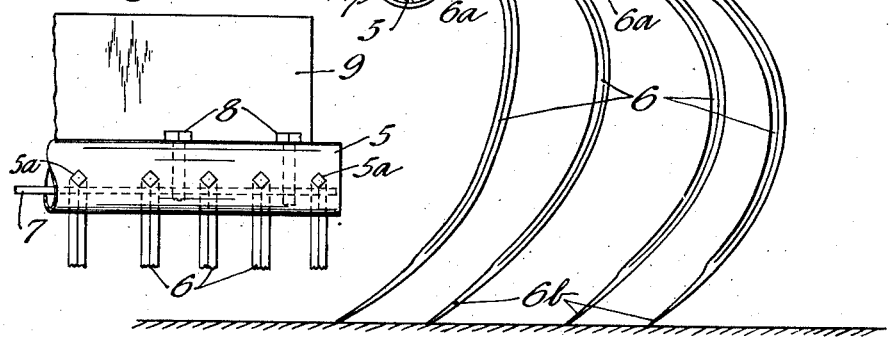
INVENTOR.
ARTHUR W. WENBORG
BY HIS ATTORNEYS.
Williamson & Williamson Patented Jan. 26, 1943

2,309,266

UNITED STATES PATENT OFFICE 2,309,266

TOOTHED CULTIVATOR

Arthur W. Wenborg, Pine City, Minn.

Application July 31, 1941, Serial No. 404,747

3 Claims. (Cl. 97—58)

This invention relates to cultivators, and particularly to hand cultivators, although applicable to other types.

It is an object of my invention to provide an extremely simple but highly effective cultivator, particularly adapted for use in gardens or on small truck farms wherein the earth-engaging elements or tines may be readily weighted as desired for digging to the desired depth.

A further object is the provision of a very economical, rugged and serviceable cultivator having provision for re-arrangement or replacement of the several tines with little effort.

Another object is the provision of an efficient cultivator of the class above described comprising a minimum number of component parts.

These and other objects and advantages will be more apparent from the following description made in connetcion with the accompanying drawing, wherein like reference characters refer to the same parts throughout the several views, and in which:

Figure 1 is a top plan view of a form of my invention with the handle broken away;

Figure 2 is a cross section taken on the line 2—2 of Fig. 1;

Figure 3 is a detail vertical section showing a simple manner of mounting and securing the weight receptacle with the structure, and Figure 4 is a detail elevational view showing the tine shank-receiving recesses in the tubular head.

In the form of the invention illustrated the several series of cultivator tines are secured by clamping means to a horizontal tubular head 5 which may be constructed from piping, said head having a series of horizontal shank-receiving recesses 5a therein, a pair of diametrically opposed recesses being formed for reception of each shank. Said recesses are so arranged that the shanks received therein are spaced apart but diverge slightly in a rearwardly direction in the outermost recesses or seats. The tines 6 are all of similar construction, although arranged in series with shanks of different lengths for each series, said shanks 6a extending horizontally, the balance of the tines being curved downwardly and having flattened, sharpened and somewhat pointed ground-engaging teeth 6b at the lower ends thereof. The shanks 6a of the several tines lie in a common plane and their forward ends extend through the corresponding recesses in the head, terminating substantially on a line disposed slightly forward of the tubular head 5. A horizontal clamping plate 7, as shown, is disposed within tubular head 5 engaged against the undersides of shanks 6a and clamped thereagainst by a plurality of vertical clamping bolts 8 which extend through suitable spaced taps in the top of head 5 and which threadedly engage at their lower portions the plate 5. A number of clamping bolts are used spaced throughout the length of the head 5 in order that the shanks of the tines 6 may be very rigidly gripped in each instance. The several tines are arranged in series, as shown, the forward series being fewer in number and disposed centrally of the cultivator, while the next succeeding series is disposed outwardly staggered relatively to the first, and the remaining series successively extending outwardly in staggered relation to all the tines, as clearly shown in Figure 1.

A simple weight container 9, as shown of box-like form having an open top, is supported upon the tops of the several horizontal shanks 6a of the tines and may be rigidly secured thereto by suitable means such as hook bolts 10 having the hooked lower ends thereof embracing certain of the tines.

In the hand cultivator illustrated an elongated handle 11 is centrally and rigidly connected with the tubular cross head 5 extending at an acute angle to the plane defined by the tine shanks 6a.

In use, stones or other weights are placed in the container 9 to cause penetration of the teeth to the desired depth in the soil when the cultivator is drawn through the ground. Thus wide variance is obtained in the gravitative effects simply and effectively. The effective cultivating width of the device may be very readily changed by loosening the end bolts of the head 5 and removing the desired number of outwardly disposed teeth.

It will be noted that with the arrangement of teeth in staggered relation and in series, each successive series from the forward end of the cultivator, covering a wider swath than the preceding, the soil is very effectively cultivated and worked. The device is light, rugged and compact and may be manufactured at very low cost. The simplicity of construction and attachment of the tines and weight receptacle with the cultivator head is important and improved over the prior art.

It will, of course, be understood that various changes may be made in the form, details, arrangements and proportions of the parts without departing from the scope of my invention.

What is claimed is:

1. A cultivator comprising, an elongated tubular head having a series of spaced, substantially diametric shank-receiving recesses formed therein, a plurality of cutivator tines having substantially horizontal shanks disposed in said respective recessed portions, the horizontal portions of said tines being of various lengths to provide an arrangement of several series of tines from front to rear of said cultivator, all of said tines being disposed in staggered relation, an elongated clamping plate disposed within said tubular head below said shanks, and a series of clamping bolts passing through the top of said head and threadedly engaging said plate to securely clamp said tines in working position.

2. A cultivator comprising, an elongated tubular head having a series of spaced, substantially diametric, rectangular shank-receiving recesses formed therein, a plurality of cultivator tines having substantially horizontal shanks disposed in said respective recessed portions, said shanks being of rectangular cross section, the horizontal portions of said tines being of various lengths to provide an arrangement of several series of tines from front to rear of said cultivator, all of said tines being disposed in staggered relation, an elongated clamping plate disposed within said tubular head below said shanks, and a series of clamping bolts passing through the top of said head and threadedly engaging said plate to securely clamp said tines in working position.

3. A cultivator comprising an elongated tubular head having a series of spaced, substantially diametric shank-receiving recesses formed therein, a plurality of cultivator tines having substantially horizontal shanks disposed in said respective recessed portions, the horizontal portions of said tines being of various lengths to provide an arrangement of several series of tines from front to rear of said cultivator, all of said tines being disposed in staggered relation, an elongated clamping plate disposed within said tubular head below said shanks, a series of clamping bolts passing through the top of said head and threadedly engaging said plate to securely clamp said tines in working position, the horizontal portions of said tines being disposed in substantially a common horizontal plane, a boxlike weight receptacle supported from said horizontal shanks and means depending from the bottom of said receptacle securing the same to said shanks.

ARTHUR W. WENBORG.